(12) United States Patent
Wong et al.

(10) Patent No.: US 10,829,616 B2
(45) Date of Patent: Nov. 10, 2020

(54) ELASTOMER CONTAINING COMBINATION OF TRIS(NONYL PHENYL) PHOSPHITE AND TETRAMETHYLETHYLENEDIAMINE, PREPARATION AND COMPOSITIONS AND ARTICLES OF MANUFACTURE THEREOF

(71) Applicant: The Goodyear Tire & Rubber Company, Akron, OH (US)

(72) Inventors: Tang Hong Wong, Hudson, OH (US); Ryan Matthew Plocinik, Cuyahoga Falls, OH (US); David Bruce Botts, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/546,801

(22) Filed: Aug. 21, 2019

(65) Prior Publication Data

US 2019/0375915 A1 Dec. 12, 2019

Related U.S. Application Data

(62) Division of application No. 15/361,549, filed on Nov. 28, 2016, now Pat. No. 10,428,202, which is a division of application No. 14/447,089, filed on Jul. 30, 2014, now Pat. No. 9,534,107.

(51) Int. Cl.
| | | |
|---|---|---|
| *C08K 5/526* | (2006.01) | |
| *C08L 21/00* | (2006.01) | |
| *C08K 5/00* | (2006.01) | |
| *C08K 5/17* | (2006.01) | |
| *C08L 53/02* | (2006.01) | |
| *C08L 25/06* | (2006.01) | |
| *C08L 47/00* | (2006.01) | |
| *C09K 15/20* | (2006.01) | |
| *C08L 9/00* | (2006.01) | |
| *C09K 15/06* | (2006.01) | |
| *C09K 15/18* | (2006.01) | |

(52) U.S. Cl.
CPC .............. *C08K 5/526* (2013.01); *C08K 5/005* (2013.01); *C08K 5/17* (2013.01); *C08L 9/00* (2013.01); *C08L 21/00* (2013.01); *C08L 25/06* (2013.01); *C08L 47/00* (2013.01); *C08L 53/02* (2013.01); *C09K 15/06* (2013.01); *C09K 15/18* (2013.01); *C09K 15/20* (2013.01); *C08L 2201/08* (2013.01); *C08L 2666/24* (2013.01)

(58) Field of Classification Search
CPC .......... C08K 5/005; C08K 5/17; C08K 5/526; C09K 15/20; C09K 15/06; C09K 15/18; C08L 53/02; C08L 2666/24; C08L 21/00; C08L 25/06; C08L 9/00; C08L 47/00; C08L 2201/08
See application file for complete search history.

(56) References Cited

U.S. PATENT DOCUMENTS

| | | | |
|---|---|---|---|
| 3,553,298 | A | 1/1971 | Hodan et al. |
| 4,183,878 | A | 1/1980 | Biletch et al. |
| 4,212,789 | A | 7/1980 | Anspon |
| 5,371,263 | A | 12/1994 | Quotschalla et al. |
| 5,451,646 | A | 9/1995 | Castner |
| 5,532,401 | A | 7/1996 | Stevenson et al. |
| 6,150,439 | A | 11/2000 | Keiichi et al. |
| 6,534,593 | B1 | 3/2003 | Komatsuzaki et al. |
| 8,563,637 | B2 | 10/2013 | Jakupca et al. |
| 2004/0077789 | A1 | 4/2004 | Toda et al. |
| 2006/0235165 | A1 | 10/2006 | Kawanabe |
| 2013/0237666 | A1 | 9/2013 | Nicolin et al. |
| 2017/0073500 | A1 | 3/2017 | Wong et al. |

FOREIGN PATENT DOCUMENTS

| | | |
|---|---|---|
| CN | 1193629 A | 9/1998 |
| CN | 103172807 | 6/2013 |

*Primary Examiner* — Angela C Scott
(74) *Attorney, Agent, or Firm* — John D. DeLong

(57) ABSTRACT

This invention relates to compositions comprised of diene-based elastomers containing an antioxidant comprised of a combination of tris(nonyl phenyl) phosphite (TNPP) and tetramethylethylene diamine (TMEDA). The invention further relates a rubber composition and to a polystyrene composite containing such elastomer compositions. The invention additionally relates to articles of manufacture thereof, including tires and polystyrene based articles. In one embodiment, the invention relates to a process of recovery of diene-based elastomer(s) from an organic solvent solution thereof by steam stripping the organic solvent therefrom in the presence of a combination of the TNPP and TMEDA.

2 Claims, No Drawings

ELASTOMER CONTAINING COMBINATION OF TRIS(NONYL PHENYL) PHOSPHITE AND TETRAMETHYLETHYLENEDIAMINE, PREPARATION AND COMPOSITIONS AND ARTICLES OF MANUFACTURE THEREOF

FIELD OF THE INVENTION

This invention relates to compositions comprised of diene-based elastomers containing an antioxidant comprised of a combination of tris(nonyl phenyl) phosphite (TNPP) and tetramethylethylene diamine (TMEDA). The invention further relates a rubber composition and to a polystyrene composite containing such elastomer compositions. The invention additionally relates to articles of manufacture thereof, including tires and polystyrene based articles. In one embodiment, the invention relates to a process of recovery of diene-based elastomer(s) from an organic solvent solution thereof by steam stripping the organic solvent therefrom in the presence of a combination of the TNPP and TMEDA.

BACKGROUND OF THE INVENTION

Various polymers, such as for example polyethylene and polypropylene, as well as various diene-based synthetic elastomers and polystyrene containing such elastomers have sometimes been stabilized against degradation caused by exposure to atmospheric ozone by containing a tris(nonyl phenyl) phosphite (referred to herein as "TNPP").

In practice, the TNPP apparently functions as a stabilizer for carbon-to-carbon bond containing synthetic rubber as, for example, by inhibiting crosslinking of the synthetic rubber caused by exposure to, and thereby reaction with, atmospheric ozone, particularly free radicals formed by the ozone which may include, for example, various peroxides. By such reaction, products such as for example, a phosphate and corresponding alcohol may be formed by reaction with the TNPP.

In practice, however, the TNPP can hydrolyze in the presence of water to form, for example, di-substituted phosphates such as, for example, a dialkyl or diaryl hydrogen phosphate, which is less active as an antioxidant for the synthetic elastomers than the TNPP. For example, see U.S. Pat. No. 5,532,401. Such TNPP degradation by hydrolysis may be evidenced by the presence of nonyl phenol formed by such hydrolysis based degradation.

For this invention it is desired to evaluate providing a resistance of such hydrolytic degradation of the TNPP and thereby a more effective stabilization of diene-based elastomers such as polybutadiene and polyisoprene and products containing such elastomers stabilized by providing a combination of the TNPP and tetramethylethylene diamine (TMEDA).

For the preparation of the elastomers, at least one of 1,3-butadiene and styrene monomer(s) is polymerized with the aid of initiator/catalyst in a organic solvent solution to form a polymerizate (sometimes referred to as a cement) comprised of the solvent and, for example, the polybutadiene or polyisoprene elastomer. Such elastomer may be recovered from its polymerizate by steam stripping the solvent from the polymerizate which necessarily subjects the elastomer to an exposure to water at an elevated temperature from the steam condensation.

For this invention, it is desired to use TNPP as an antioxidant to retard or inhibit degradation of such recovered elastomer upon exposure to atmospheric ozone by providing the TNPP as an ingredient in the polymerizate from which the elastomer containing the TNPP is recovered from the polymerizate by stream stripping the solvent away from the polymerizate to yield the recovered elastomer containing the TNPP.

Such recovery of the elastomer from its solvent by steam stripping will necessarily require exposure of the TNPP to water formed by steam condensation in the steam stripping process. Such water exposure, particularly at the elevated temperature of the condensing steam, promotes hydrolysis of the TNPP to thereby render it less effective as an antioxidant for the recovered elastomer.

Therefore, it is desirable for the TNPP to have a resistance to such hydrolysis and therefore to have hydrolytic stability upon exposure to water from the elevated temperature stream stripping process used for recovery of the elastomer from its polymerizate.

For this invention, it is desired to evaluate providing a resistance to hydrolysis of the TNPP in the presence of moisture, particularly at the elevated temperature of the steam stripping process.

For such evaluation, it is desired to evaluate providing a resistance to hydrolytic degradation of TNPP with tetramethylethylenediamine (TMEDA). The inclusion of the TMEDA may be viewed as promoting hydrolytic stability for the TNPP antioxidant particularly upon the TNPP being exposed to moisture at an elevated temperature as well as promoting hydrolytic stability for the TNPP in general to therefore enhance an effectiveness of the TNPP as an antioxidant for diene-based elastomers such as polyisoprene and polybutadiene.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

DISCLOSURE AND PRACTICE OF THE INVENTION

In accordance with this invention, a composite is provided comprised of a combination of tris(nonyl phenyl) phosphite (TNPP) and tetramethylethylene diamine (TMEDA).

In accordance with this invention, an elastomer composite is provided comprised of diene-based elastomer which contains an antioxidant comprised of a combination of tris (nonyl phenyl) phosphite (TNPP) and tetramethylethylene diamine (TMEDA). Such diene-based elastomer may, for example, be comprised of at least one of polyisoprene and polybutadiene. Inhibition of hydrolysis of the TNPP is provided by the TMEDA in the presence of water at an elevated temperature for recovery of such diene-based elastomer from a solvent solution of the elastomer(a) by steam stripping procedure.

In further accordance with this invention, a rubber composition is provided comprised of such elastomer composite of antioxidant-containing elastomer.

In additional accordance with this invention, a polystyrene composite is provided comprised of polystyrene which contains containing such antioxidant-containing elastomer composite or rubber composition thereof.

In further accordance with this invention, an article of manufacture is provided having a component comprised of at least one of said elastomer composite, rubber composition and polystyrene composite. Such articles of manufacture include, for example, tires containing a component of such rubber composition and polystyrene based articles containing a component of such polystyrene composite.

In further accordance with this invention, a process is provided of recovering diene-based elastomer(s) from an organic solvent solution thereof by steam stripping the organic solvent from the solution in the presence of a combination of the TNPP and TMEDA to yield the elastomer(s) which contains the combination of TNPP and TMEDA. Such diene-based elastomer may be, for example, polybutadiene or polyisoprene. By steam stripping process, steam is injected into the solvent solution in which the steam is condensed to form a solvent solution/water mixture at an elevated temperature sufficient to drive off the solvent (by evaporation).

An important aspect of the invention is providing an antioxidant for diene-based elastomers, particularly polyisoprene and polybutadiene, as a combination of tris(nonyl phenyl) phosphite (TNPP) and tetramethylethylenediamine (TMEDA) to promote hydrolytic stability for the TNPP, particularly in the presence of water at an elevated temperature (e.g. at a water temperature of from about 80° C. to about 95° C.) from the steam stripping process of elastomer recovery.

Therefore, in one embodiment, the invention relates to such diene-based elastomer containing said combination of TNPP and TMEDA as a product of steam stripping an organic solvent from an organic solvent solution of such diene-based elastomer in the presence of said combination of TNPP and TMEDA.

In one embodiment, the combination of said TNPP and TMEDA is provided in a weight ratio of TNPP to TMEDA in a range of from about 4/1 to about 50/1, alternately from about 5/1 to about 10/1.

Therefore, in a summary, an article of manufacture is provided as:

(A) a tire having a component comprised of a rubber composition containing at least one of polyisoprene and polybutadiene elastomer(s), particularly as prepared by steam stripping said elastomer(s) from an organic solvent solution thereof (for example, at an elevated temperature of water which contains such solvent solution in a range of from about 80° C. to about 95° C.) wherein said elastomer (e.g. said solvent solution) during said steam stripping process contains an antioxidant comprised of a combination of tris(nonyl phenyl) phosphite (TNPP) and tetramethylethylenediamine (TMEDA), and (B) a polystyrene composite comprised of a rigid matrix of a combination of polystyrene and at least one of polyisoprene and polybutadiene elastomer, preferably polybutadiene elastomer, where said elastomer(s) is the product of steam stripping said elastomer(s) from an organic solvent solution (at an elevated temperature) wherein said elastomer (during said steam stripping process) contains an antioxidant comprised of a combination of tris(nonyl phenyl) phosphite (TNPP) and tetramethylethylenediamine (TMEDA).

In one embodiment, such polystyrene composite may be the product of polymerizing styrene monomer containing (and therefore in the presence of) the polyisoprene or polybutadiene containing (together with) the combination of TNPP and TMEDA.

Representative examples of polystyrene composites, particularly high impact polystyrene composites comprised of polystyrene and diene-based elastomer such as polyisoprene and polybutadiene may be found, for example and not intended to be limiting, in U.S. Pat. Nos. 4,183,878 and 4,212,789.

The invention may be better understood by reference to the following example in which the parts and percentages are by weight unless otherwise indicated.

EXAMPLE I

An evaluation of treatment of tris(nonyl phenyl) phosphite (TNPP) is undertaken to determine if hydrolytic stability of TNPP can be promoted at elevated temperatures.

For such evaluation, tetramethylethylenediamine (TMEDA) is selected for combination with the TNPP to promote the resistance of the TNPP to hydrolysis.

For the evaluation undertaken by this Example, samples comprised of 3.5 grams of TNPP were blended 30 grams of an organic solvent as hexane in small glass bottles.

Sample A was a solvent mixture of the TNPP and organic solvent, provided as hexane.

Sample B was the hexane solvent mixture of the TNPP and 0.3 grams of TMEDA.

Sample C was the hexane solvent mixture of the TNPP and 0.6 grams of TMEDA.

Sample D was the hexane solvent mixture of the TNPP and 0.05 grams of H3PO4

Each Sample also included 40 grams of water to provide exposure of the TNPP to water.

The glass bottles containing the samples were capped and placed in a tumbling water bath held at 90° C. for a period of 6 hours. Aliquots were periodically taken from each of the Samples over a period of about two hours to monitor the extent of degradation of the TNPP by hydrolysis. Degradation of the TNPP by hydrolysis was evidenced to evolution of nonyl phenol as a product of such degradation of the TNPP as analyzed by high performance liquid chromatography (referred to herein as HPLC). The extent of TNPP degradation is relative to the nonyl phenol detected by the analysis. The TNPP is reported herein as being completely hydrolytically degraded if (or when) a quantitative amount or nonyl phenol is detected.

The results of the evaluation are reported in the following Table 1.

TABLE 1

Samples Comprised of 3.5 g TNPP, 30 g solvent, 40 g water)

| Added Ingredients | Level of Degradation |
|---|---|
| (A) None | complete hydrolytic degradation after 2-3 hours |
| (B) 0.3 g TMEDA | hydrolytic degradation not observed (N/D) |
| (C) 0.6 g TMEDA | hydrolytic degradation not observed (N/D) |
| (D) 0.05 g $H_3PO_4$ | complete hydrolytic degradation after 2-3 hours |

It is concluded that this evaluation illustrates that an addition of TMEDA to a solvent and water mixture containing TNPP significantly increased the hydrolytic stability of the TNPP in such medium, particularly for Samples B and C for which hydrolytic degradation was not observed.

EXAMPLE II

After the successful promotion of hydrolytic stability of the TNPP in a solvent/water medium by addition of the TMEDA was observed in Example I, an evaluation of hydrolytic stability of TNPP was undertaken where the TNPP was contained in a polymerizate comprised of polybutadiene rubber and organic solvent, namely hexane, used for its formation by polymerization of 1,3-butadiene monomer in the presence of the solvent and a catalytic initiator from which the polybutadiene rubber is recovered by steam stripping the solvent from the polymerizate.

The polybutadiene rubber was prepared by polymerization of 1,3-butadeiene monomer in the presence of a nickel catalyst in an organic solvent, namely hexane, solution. Exemplary of such polymerization may be found, for example, in U.S. Pat. No. 5,451,646 which illustrates nickel catalyzed polymerization of 1,3-butadiene monomer with a catalyst system comprised of, for example, a combination of an organonickel compound (e.g. nickel salt of a carboxylic acid), organoaluminum compound (e.g. trialkylaluminum) and fluoride containing compound (e.g. hydrogen fluoride or complex thereof).

The polymerization was conducted in a series of continuous polymerization reactors stabilized by an inclusion of 0.7 phr of the TNPP (together with 0.25 phr of a normally included antioxidant for the TNPP) for which it was observed in Example I that the TMEDA provided a suitable hydrolytic stability of TNPP at an elevated temperature.

Steam stripping was utilized to remove the solvent from the resultant polymerizate, which might be referred to as cement, the for recovery of the polybutadiene rubber. For the steam stripping operation, a tank was provided with water which was brought to about 90° C. temperature by steam injection into the water. To the heated water, the polymerizate, or cement, was slowly added. When the cement addition was complete, the steam injection into the water was allowed to continue for about an additional 20 minutes to drive out the solvent and any residual volatiles. The temperature was reduced to about 60° C. to about 70° C. by addition of water at ambient temperature. The polybutadiene in the tank was physically reduced to a form of rubber crumbs by the stripping process. The rubber crumbs were fed to a dewatering apparatus which is similar to a single screw rubber extruder. The resultant moisture content of the rubber crumbs was about 1 to about 5 weight percent. The wet recovered rubber crumbs were placed in a hot air oven for about 24 hours which was maintained at about 60° C. The resulting moisture in the recovered rubber crumbs was about 0.5 weight percent.

A sample of the recovered rubber crumbs was analyzed by HPLC to report residual ingredients reported in the following Table 3 in terms of phr (parts by weight per 100 parts of rubber). The nonyl phenol is a degradation product of hydrolysis of TNPP.

TABLE 3

| Ingredients | phr recovered | phr included in the polymerization |
| --- | --- | --- |
| Nonyl phenol | 0 (none detected) | 0 |
| TNPP | 0.52 | 0.7 |
| Antioxidant for the TNPP[1] | 0.27 | 0.25 |

[1]antioxidant for the TNPP as "octadecyl-3-(3,5-di-tert-butyl-4-hydroxyphenyl-propionate"

It is apparent that some degradation, or loss, of the TNPP occurred since 0.52 phr was recovered from 0.7 phr originally introduced. However, no detectable hydrolysis of the TNPP was observed since the presence of nonyl phenol (a product which would have been resulted from degradation of the TNPP by hydrolysis) was not detected.

Therefore, it is concluded that an inclusion of the of the TMEDA in the TNPP containing solution polymerization of 1,3-butadiene monomer to form the polybutadiene rubber from which the rubber is recovered from its polymerizate (cement) by steam stripping at an elevated temperature (e.g. 98° C.) to remove the solvent provided a hydrolytic stability of the TNPP.

EXAMPLE III

An experiment was undertaken in the manner of Example II to evaluate the hydrolytic stability of the TNPP in the steam stripping operation of the solvent-containing polybutadiene polymerizate at the elevated temperature without the inclusion of the TMEDA. A sample of the recovered rubber crumbs was analyzed by HPLC with residual ingredients reported in the following Table 3 in terms of phr (parts by weight per 100 parts of rubber). The nonyl phenol is a degradation product of hydrolysis of TNPP.

TABLE 4

| Ingredients | phr recovered | phr included in the polymerization |
| --- | --- | --- |
| nonylphenol | 0.45 | 0 |
| antioxidant for the TNPP[1] | 0.19 | 0.25 |
| TNPP | 0.33 | 0.7 |

[1]Antioxident for the TNPP as "octadecyl-3-(3,5-di-tert-butyl-4-hydroxyphenyl-propionate"

It is apparent from the indicated formation of the nonyl phenol and significant reduction of the TNPP that that a considerable hydrolysis degradation of the TNPP occurred.

Therefore, it is concluded that it was verified that hydrolytic stability of the TNPP (reported in Example II) is promoted by the inclusion of the of the TMEDA in the TNPP containing solution polymerization of 1,3-butadiene monomer to form the polybutadiene rubber from which the rubber is recovered from its polymerizate (cement) by steam stripping at an elevated temperature (e.g. about 92° C.) to remove the solvent.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a polystyrene composite comprising the step of polymerizing styrene in the presence of an elastomer composite comprised of diene-based elastomer containing an antioxidant comprised of a combination of tris(nonyl phenyl) phosphite (TNPP) and tetramethylethylene diamine (TMEDA) in a weight ratio of TNPP to TMEDA in a range of from about 4/1 to about 50/1.

2. The process of claim 1 wherein said diene-based elastomer is at least one of polybutadiene and polyisoprene.

* * * * *